(12) United States Patent
Alkeskjold

(10) Patent No.: US 7,988,369 B2
(45) Date of Patent: Aug. 2, 2011

(54) PACKAGE AND ASSEMBLY FOR OPTICAL COMPONENTS SUCH AS OPTICAL FIBRES

(75) Inventor: Thomas Tanggaard Alkeskjold, Jyllinge (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 300 days.

(21) Appl. No.: 12/087,447

(22) PCT Filed: Jan. 5, 2007

(86) PCT No.: PCT/DK2007/000004
§ 371 (c)(1),
(2), (4) Date: May 7, 2009

(87) PCT Pub. No.: WO2007/076872
PCT Pub. Date: Jul. 12, 2007

(65) Prior Publication Data
US 2010/0002996 A1 Jan. 7, 2010

(30) Foreign Application Priority Data

Jan. 5, 2006 (EP) .................................. 06388001

(51) Int. Cl.
*G02B 6/36* (2006.01)
*G02B 6/00* (2006.01)
*G02B 6/12* (2006.01)

(52) U.S. Cl. ................ 385/92; 385/12; 385/14; 385/27; 385/40; 385/94

(58) Field of Classification Search .................... 385/12, 385/14, 27, 39–41, 51, 88–92, 94; 439/17, 439/74, 577
See application file for complete search history.

(56) References Cited

U.S. PATENT DOCUMENTS
5,544,269 A 8/1996 Hattori
(Continued)

FOREIGN PATENT DOCUMENTS
EP 0718878 12/1994
(Continued)

OTHER PUBLICATIONS
XP002379775, J.D. Crow, Fiber-Optic Switch, IBM Technical Disclosure Bulletin, vol. 21, No. 11, Apr. 1979, NN 79044686.
(Continued)

*Primary Examiner* — Brian M. Healy
*Assistant Examiner* — Michael P Mooney
(74) *Attorney, Agent, or Firm* — Cooper & Dunham LLP

(57) ABSTRACT

A package comprises a substrate (101, 401) with a longitudinal direction and a lateral direction perpendicular thereto. The substrate (101, 401) has a recess (103, 403) formed in a first surface (102, 402) and the recess (103, 403) extends in the longitudi¬nal direction of the substrate (101, 401), said recess (103, 403) having an inner sur¬face. The inner surface of the recess (103, 403) comprises at least a first set of con¬ductive areas. The first set comprises at least a first area (106, 406) and a second area (107, 407) being provided with a conductive layer, said first area (106, 406) and said second area (107, 407) being mutually spaced in the lateral direction. The package ad¬ditionally comprises a cap (151, 251, 351, 451.) with a first surface (152, 252, 352, 452) for mounting on top of said first surface (102, 402) of said substrate (101, 401), the cap (151, 251, 351, 451) and the recess (103, 403) of the substrate (101, 401) defining an elongated channel in the longitudinal direction. The cap (151, 251, 351) comprises at least a first set of conductive areas, said first set comprising at least a first area (156, 256, 356) and a second area (157, 257, 357) provided with a conductive layer, said first area (156, 256, 356) and said second area (157, 257, 357) being mutually spaced in the lateral direction.

14 Claims, 7 Drawing Sheets

U.S. PATENT DOCUMENTS

2004/0146248 A1   7/2004   Hong
2005/0169590 A1   8/2005   Alkeskjold

FOREIGN PATENT DOCUMENTS

| | | |
|---|---|---|
| EP | 1199583 | 4/2002 |
| EP | 1798580 | 6/2007 |
| EP | 1798581 | 6/2007 |
| JP | 56072413 | 6/1981 |

OTHER PUBLICATIONS

XP-000950309, P.S. Westbrook et al., Cladding-Mode Resonances in Hybrid Polymer-Silica Microstructured Optical Fiber Gratings, IEEE Phototonics Technology Letters, vol. 12, No. 5, May 2000, p. 495-497.

PACKAGE AND ASSEMBLY FOR OPTICAL COMPONENTS SUCH AS OPTICAL FIBRES

TECHNICAL FIELD

The present invention relates to a package comprising a substrate with a longitudinal direction and a lateral direction perpendicular thereto, said substrate having a recess formed in a first surface and extending in the longitudinal direction of the substrate, said recess having an inner surface, said inner surface of said recess comprising at least a first set of conductive areas, said first set comprising at least a first area and a second area being provided with a conductive layer, said first area and said second area being mutually spaced in the lateral direction, and a cap with a first surface for mounting on top of said first surface of said substrate, the cap and the recess of the substrate defining an elongated channel in the longitudinal direction.

BACKGROUND ART

Optical fibres with or without tunability are used in a wide range of technical areas, such as optical communication, sensor technologies, imaging, lithography, opto-medical systems, material processing and so forth.

It is desirable to be able to shape the spectral properties for the light propagation of such a fibre and if possible on a short time scale and for a number of different wave-lengths. This applies both to continuous wave systems and pulsed wave systems.

For optical communication, for example, it is desirable to be able to send signals at a high bit rate over long distances. This requires short light pulses of high intensity and fibres with little or no pulse distortion due to for instance dispersion or non-linear effects. As communication over the years has developed towards higher bit rates, there is a continuous need for improving properties of fibres, such as being able to shape the transmission spectrum of the fibre and/or tune the transmission properties of the fibre, such as the polarisation of light propagating through the fibre.

Within the last couple of years a new type of optical fibre has shown the ability to guide light in a core surrounded by microstructured elements, which are elongated in the longitudinal direction of the fibre. These fibres are amongst others known as photonic crystal fibres, photonic bandgap fibres and holey fibres.

US 2005/0169590 discloses an optical fibre, which comprises a core region and a microstructured cladding region surrounding the core region. The cladding region includes a number of cladding elements or air holes, said cladding elements being arranged in a two-dimensional periodic manner or a Bragg-type of manner. At least a number of the cladding elements are filled in at least one longitudinally extending section of the optical fibre with a liquid crystal material. This section exhibits a photonic bandgap effect for at least one phase state of the liquid crystal. The optical properties of the crystal fibre can be changed by use of for instance heating means or electrooptical means. Thereby it is possible to change the spectral transmission bands of the optical fibre.

EP patent application EP 05388109 discloses an optical fibre of the photonic bandgap type, wherein the fibre comprises a transition region, in which the fibre is tapered or otherwise shaped in order to shape the transmission spectrum of the fibre. At least a part of the transition region is filled with or consists of a high refractive index material, such as liquid crystal, which is sensitive to external influences, such as thermal influences or electrical fields. Thereby, it is possible to tune the transmission spectrum of the fibre by use of thermal or electrical means.

EP patent application EP 05388110 discloses an optical fibre of the photonic bandgap type, wherein the fibre comprises a number of first cladding elements with a first cross-sectional dimension and at least one second cladding element with a second cross-sectional dimension, wherein the first cross-sectional dimension and the second cross-sectional dimension are different. This introduces a defect to the lattice structure of the cladding elements, in which pseudo-surface modes can propagate, and in effect a notch-filter can be obtained. Along at least a part of the longitudinal direction of the fibre, said cladding elements are filled with or consist of a high refractive index material, such as liquid crystal, which are sensitive to external influences, such as thermal influences or electrical fields. Thereby, it is possible to tune the transmission spectrum of the fibre by use of thermal or electrical means.

"Fiber-optic switch", J. D. Crow, IBM Technical Bulletin, Vol. 21, no. 11, April 1979, page 4686, XP002379775, discloses a fibre-optic switch comprising a first substrate made of silicon and having a first groove. A second mating substrate with a second groove is placed on top of the first substrate. The second groove has two electrodes and when a potential is applied between the two electrodes forming an electric field there between, the end of an input fibre positions itself in the second groove. When the field is removed by turning off the applied voltage, the natural elasticity of the fibre causes it to relax to a position against the first groove. Two output fibres are positioned in the grooves with their end faces very close to the two alternative positions of the input fibre, thereby being able to collect the light from the input fibre.

All the aforementioned photonic bandgap fibres have a need for a simple and inexpensive package and/or actuator means for tuning the transmission properties of the fibre.

BRIEF DESCRIPTION OF THE INVENTION

The purpose of the invention is to provide a new and improved package and assembly suited for packaging of optical component, such as optical fibres.

This is according to the invention achieved by said cap comprising at least a first set of conductive areas, said first set comprising at least a first area and a second provided with a conductive layer, said first area and said second area being mutually spaced in the lateral direction.

The conductive layers of the first areas and the second areas can be connected to a voltage source, thereby creating a voltage differential between the conductive areas and in effect creating an electrical field between these areas. Since both the substrate and the cap comprise at least two conductive areas, it is to a wide extent possible to generate and control an arbitrary electrical field in the lateral direction of the channel. By positioning for instance a holey fibre, in which at least some of the holes along at least a part of the longitudinal direction of the fibre have been filled with a liquid crystal material, it is possible to control the orientation of the liquid crystals and thereby to control the transmission characteristics of the fibre. The conductive layers can also be thin resistive layers, in which case the layers can be used for thermal tuning of the fibre characteristics and/or thermal sensing of the ambient temperature. The use of the term "package" is meant a device, which is suitable for encapsulating an optical component, such as an optical fibre. Typically the conductive layers will be coated. The first area and the second area can extend beyond the inner surface of the recess, so that a part of the area is located on the first surface of said substrate. The elongated channel can for instance be used for fixation of an optical fibre. The cap can be mounted on top of the substrate in such a way that a gap is formed between the first surface of the substrate and the first surface of the cap, so that it is ensured that no electrical contact between the conductive layers of the cap and the substrate exist.

In a preferred embodiment according to the invention, said cap comprises a recess with an inner surface, said first area and said second area of said cap being located on said inner surface.

In a particularly preferred embodiment of the package, the recess of the substrate and/or the recess of the cap are shaped as a v-groove. This provides an easy way of positioning and aligning an optical fibre in the recess. It also makes it easy to align two fibres thus ensuring that light emitted from one fibre is effectively coupled into the second fibre. In the case where both recesses are shaped as a v-groove, these provide a simple solution for generating and to a wide extent controlling an electrical field in the cross-sectional plane of the channel, since the conductive areas are positioned across from each other. It is also possible to shape one or both of the recesses as u-grooves or flattened v-grooves. With for instance flattened v-grooves, it is possible to provide three conductive areas in each of the grooves, thus being able to position the conductive areas across from each other with for instance a mutual 120 degree angle.

According to a particular embodiment of the package, the recess extends in the entire longitudinal length of the substrate and the first set of conductive layers extends substantially along the entire length of said recess. Thereby, it is possible to generate a spatially substantially constant electrical field in the longitudinal direction of the fibre. The cap can have a similar design. It is of course possible to vary the electrical field temporally.

According to an alternative embodiment of the package, the substrate and/or the cap in the longitudinal direction have a number of sets of conductive layers. These sets will preferably comprise two areas provided with a conductive layer, said areas being spaced in the lateral direction. The sets of conductive layers can have a periodic or a quasi periodic distribution along the longitudinal direction of the channel, thereby providing means for varying the electrical field along the longitudinal direction of the channel due to the additional number of electrodes. The electrode pattern of the substrate and the cap can of course be different.

Preferably, said cap and said substrate both comprise alignment notches providing for instance a mating connection between the two parts, such as a tongue/groove connection. This can be used for easy assembly of the different parts of the package.

According to a preferred embodiment of the invention, the substrate and/or the cap are formed by silicon. Thereby, the package can be fabricated using standard silicon processing techniques, such as KOH etching or ion etching. Additionally, this material provides simple means for including electronics integrated in said substrate. However, since silicon has a finite resistivity and conducts electrical current, a thermal oxidation of the silicon is necessary before depositing the conductive layer. The thermal oxidation creates a thin layer of silica on top of the silicon. Silica is electrically non-conductive.

Alternatively, the package can be fabricated in a polymer material, such as PMMA or polycarbonate. Thereby, the substrate can be fabricated using for instance injection moulding, hot embossing and/or micro machining. This material also makes it possible to imbed electrodes and electronic components in the polymer substrate. Alternatively, the substrate and/or the cap can be fabricated in silica.

In a preferred embodiment according to the invention, the substrate and/or the cap comprises at least one additional area provided with an electrical conductive layer, said additional area providing sensing means or actuating means. The additional area can for example be part of a temperature sensor, for instance by use of an electrode with temperature sensitive resistivity. Alternatively, the additional area can be part of for instance a microheater, which can be used to control the temperature. Preferably, said additional area is positioned on said first surface of the substrate and/or the cap. It is of course also possible to have two additional areas with a conductive layer, so that they form two separate electrodes, where one electrode is used for heating and the other for thermal sensing, thereby achieving a better temperature control.

According to a preferred embodiment of the invention, the substrate and/or the cap additionally comprise one or more electrical or optical components. These can for instance be photo detectors. The photo detector can be integrated into for instance the substrate during fabrication, for example a silicon photo detector in a silicon substrate. Alternatively, they can be mounted after fabrication as individual components. The substrate can also comprise integrated electronics, such as operation amplifiers, filters, flip flops, and digital interface electronics. The electronics can be integrated into the substrate during substrate fabrication, for example silicon CMOS electronics in a silicon substrate, or mounted after substrate fabrication as individual components. Furthermore, the substrate and/or the cap can additionally comprise one or more lasers, such as semiconductor lasers or Raman lasers. The lasers can be integrated into the substrate during substrate fabrication, for example Raman lasers in a silicon substrate, or mounted after substrate fabrication as individual components. The lasers can be positioned so that light emitted from the laser effectively is coupled into a fibre, which is positioned in the channel formed by the substrate and the cap. The recesses or grooves can also contain optical components, such as a ball lens. Ball lenses can be fabricated so that their dimensions correspond to an optical fibre, for instance a ball lens with a diameter of 125 µm. The ball lens can for instance be used to collimate the light emitted from the fibre. It is thus possible to integrate all optical component and the necessary electronic components for controlling for instance tuning of the transmission spectrum of a photonic bandgap fibre in the package.

According to another preferred embodiment, the substrate and/or the cap comprise one or more additional areas provided with a conductive layer directly on the surface of the substrate and/or the cap. In case the substrate and/or the cap are formed by silicon, the conductive layer can be provided directly on the silicon. The conductive layer can be used to ground the silicon substrate and/or cap, thus forming a large equipotential plane. This can provide enhanced performance for the package.

The purpose of the invention is also achieved by an assembly comprising the aforementioned package and at least one optical fibre positioned in said recess in the substrate. That is, the assembly preferably is a substrate with a longitudinally extending recess and a cap mounted on top of the substrate, thereby creating a longitudinally extending channel, in which an optical fibre is positioned, and where an electrical field can be generated across said channel. Preferably, the cap will also comprise a recess, and the optical fibre is positioned in both recesses. The assembly can also be used to align two optical fibres positioned in said recesses.

According to a preferred embodiment of the assembly, the fibre comprises at least one longitudinally extending hole being filled with a material having optical properties, such as refractive index, which are dependent on temperature and/or electrical fields. The fibre can for instance be a photonic bandgap fibre or another holey fibre with a liquid crystal material filled in the holes. Thereby the assembly can be used to tune the transmission characteristics of the fibre.

According to another embodiment of the assembly, said package comprises fastening means for fastening the optical fibre, said fastening means being located outside the recess of the substrate. Thereby, the optical fibre can be relieved of for instance stress in the recess, which otherwise could introduce undesired optical effects. The fastening means can for instance be an adhesive.

In a particular embodiment of the assembly, the substrate and cap are sealed with an adhesive. The gap around the fibre in said longitudinally extending channel can also be sealed with an adhesive.

According to a preferred embodiment of the assembly, the adhesive is a thermally conductive material, such as thermally conducting epoxy. Thus, the adhesive conducts heat to the fibre, thereby facilitating thermal tuning of the transmission spectrum of said optical fibre.

BRIEF DESCRIPTION OF THE DRAWINGS

The invention is explained in greater detail below with reference to the accompanying drawings, in which.

BEST MODE FOR CARRYING OUT THE INVENTION

Figure 1:
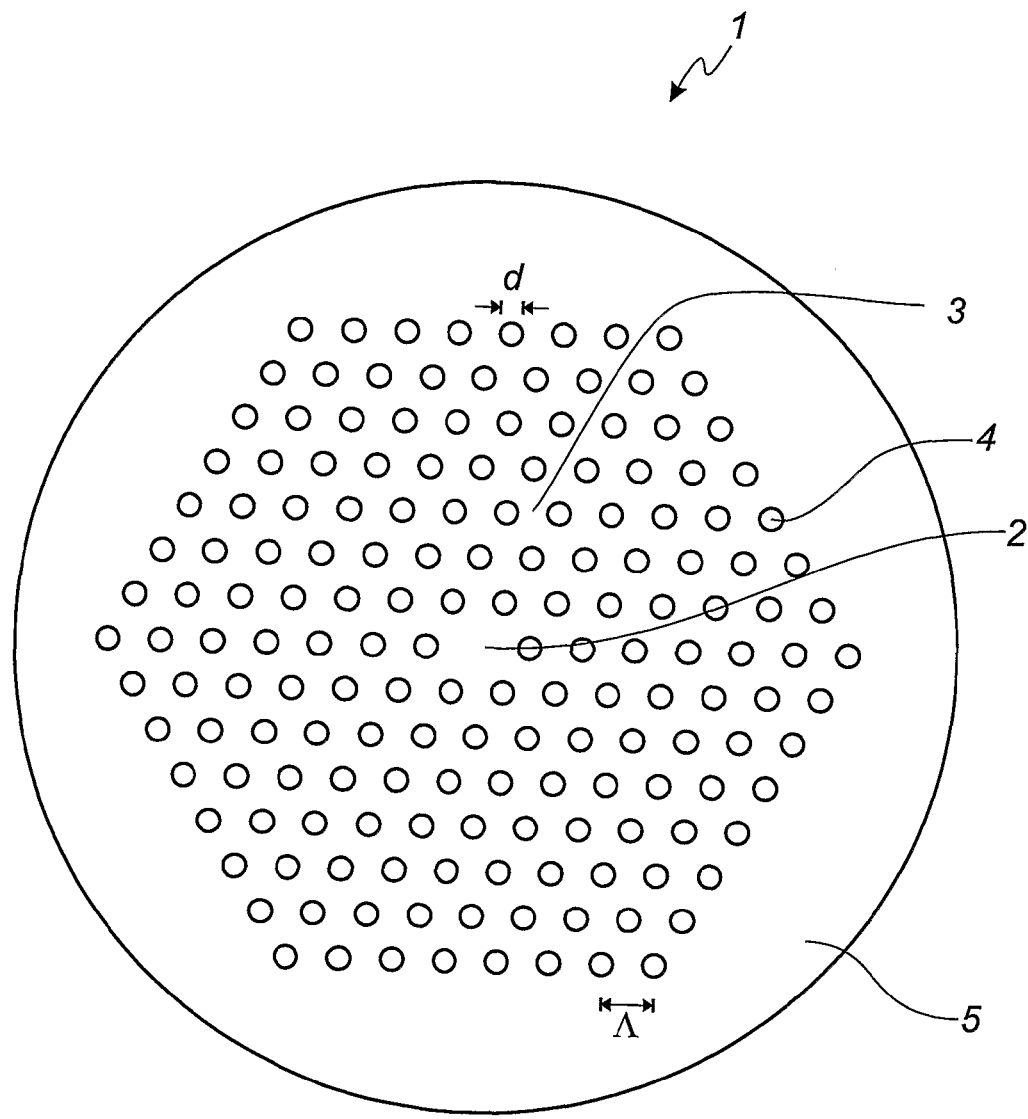
FIG. 1 shows a schematic view of the cross section of a photonic bandgap fibre, FIG. 2 a schematic view of a substrate according to the invention, FIG. 3 a cross section along the line I-I in FIG. 2, FIG. 4 a schematic view of a first embodiment of a cap according to the invention, FIG. 5 a cross section along the line II-II in FIG. 4, FIG. 6 a cross section of a first embodiment of an assembly according to the invention, FIG. 7 a schematic view of a second embodiment of a cap according to the invention, FIG. 8 a cross section of a second embodiment of an assembly according to the invention, and FIG. 9 a cross section of a third embodiment of an assembly.

FIG. 1 schematically depicts the cross-section of an optical fibre 1 of the photonic bandgap fibre type. The optical fibre 1 comprises a core region 2 and a micro-structured cladding region surrounding said core region 2. The micro-structured cladding region comprises a number of cladding elements 4, for instance in form of a number of axially or longitudinally extending holes. The cladding elements are here of equal dimension or diameter (d), but defects to the lattice structure of the hole can be introduced, for instance if the fibre 1 is to be used as a notch filter. The cladding elements 4 are placed in a background cladding material 3 and an over-cladding region 5. The cladding elements 4 surrounding the core region 2 are positioned in a two-dimensional periodic lattice or a so-called triangular structure, where the centre to centre distance between adjacent cladding elements (also called the pitch) is denoted Λ. The core region 2 is preferably made from the same or a similar material as the background cladding material 3, for instance by removing one or more of the cladding elements 4 in the centre of the cross-section of the fibre 1. The fibre 1 uses the photonic bandgap effect for light propagation in the core 2 of the fibre 1. This means that the fibre 1 can guide light with wavelengths within different bands, which among others are determined by the structure and material contents of the cladding elements 4. The refractive index of the material in said cladding elements 4 is higher than the refractive index of the background cladding material 3.

A configuration with a triangular pattern with seven "rings" as shown in FIG. 1 has shown a good photonic bandgap effect with a sharp bandgap edge. However, it is possible to design the fibre 1 with fewer or additional rings.

Such a fibre 1 has a transmission spectrum with a number of transmission bands with high transmission separated by bands with low or no transmission. Among others, the transmission spectrum is determined by material contained or filled in said cladding elements 4. This can for instance be a liquid crystal such as E7 liquid crystal from Merck, Darmstadt, Germany. This makes the transmission spectrum of the fibre 1 highly tunable by use of for instance thermal, optical or electrical means. The fibre 1 can include a taper region or another transition region in order to shape the transmission spectrum of the fibre.

Figure 2:
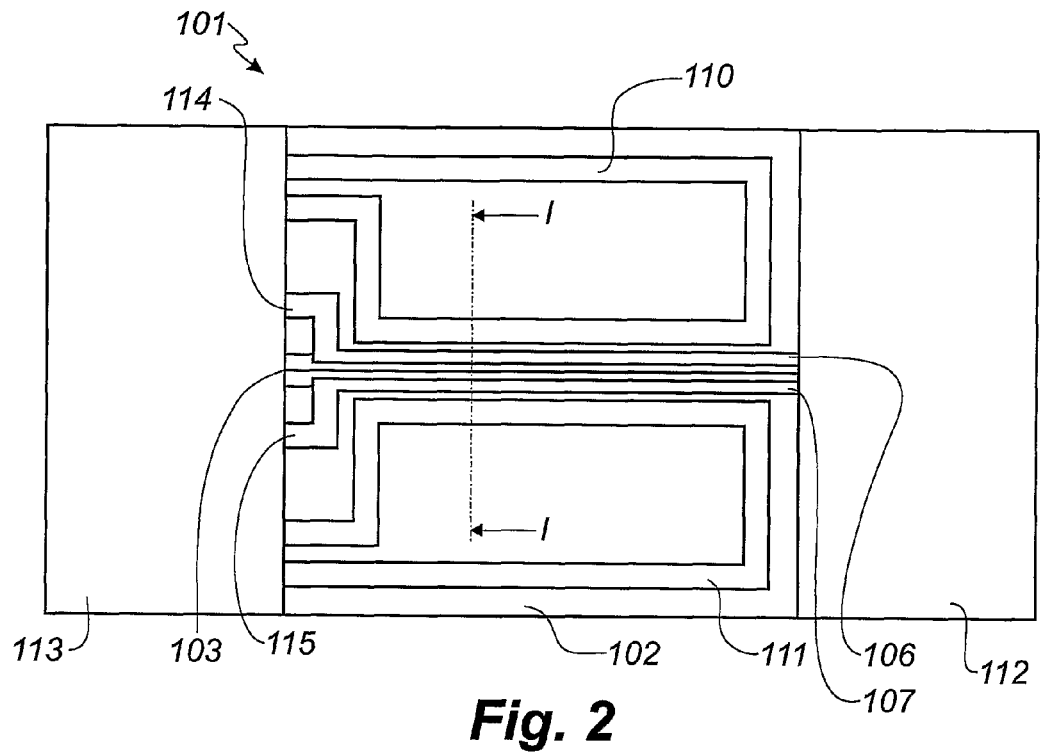
Figure 3:
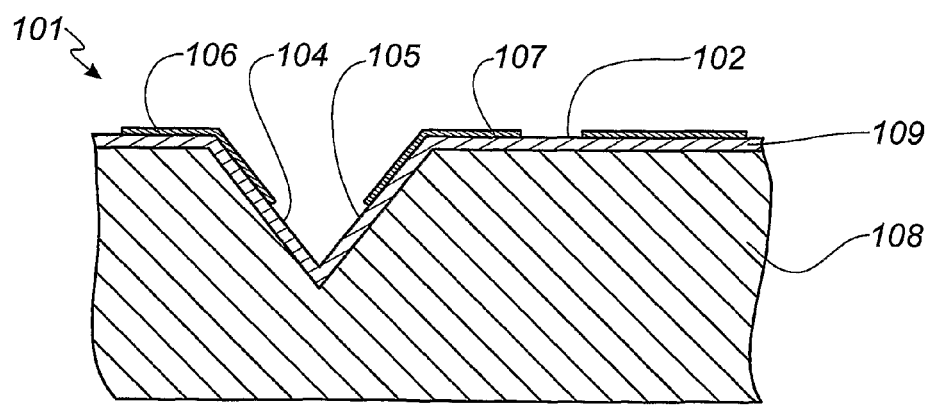

FIG. 2 shows a schematic view of a substrate 101 according to the invention, and FIG. 3 the cross section of the substrate 101 along the line I-I in FIG. 3. The substrate 101 comprises a first surface 102, in which a recess 103 is formed, said recess 103 extending in the longitudinal direction of the substrate 101. The recess is in this embodiment shaped as a v-groove with a first recess surface 104 and a second recess surface 105. The first recess surface 104 has a first area 106, which is provided with an electrically conductive layer, and the second recess surface 105 has a second area 107, which is provided with an electrically conductive layer. The two areas provided with a conductive layer in effect form a first electrode 106 and a second electrode 107, which can be applied to a voltage source, for instance at the two terminal points 114, 115, thereby creating a voltage potential between the two electrodes 106, 107 and in effect forming an electrical field between the two electrodes 106, 107. In the shown embodiment, the two electrodes 106, 107 extend substantially along the entire length of the recess 103 and consequently an electrical field, which is substantially constant in the entire length of the recess 103, is formed.

The two electrodes 106, 107 can be formed, so that the entire electrodes are located inside the recess 103, but they can also be formed so that part of the electrodes are located on top of the first surface 102 of the recess 101 as shown in FIG. 2 and FIG. 3.

On each side of the recess 103 a first additional area 110 and a second additional area 111, respectively, are provided. The two additional areas 110, 111 are both provided with a conductive layer, in effect forming two additional electrodes. The two electrodes 110, 111 can be used as for instance resistive microheaters or as temperature sensors, where the resistivity of the electrodes 110, 111 is dependent on temperature variations. It is of course also possible to use one electrode as a microheater and the other electrode as temperature sensor, thereby to a high degree being able to control the ambient temperature.

The substrate 101 is intended for packaging of optical components, such as optical fibres, which are tunable by for instance electrical fields and/or temperature. The substrate 101 is especially suitable for holey fibres, in which at least one hole along at least a longitudinally extending part is filled with a high index material, such as liquid crystal, or a photonic bandgap fibre 1 as shown in FIG. 1. Since liquid crystals are highly sensitive to temperature influences and electrical fields, it is possible to tune the transmission properties of said fibre 1 by placing the fibre with the liquid crystal in the recess 103 of the substrate 101 and varying the electrical field across the aperture by controlling the voltage potential between the two electrodes 106, 107 in the recess 103 and the temperature by use of the two additional electrodes 110, 111. The recess 103 can also be used for aligning two optical fibres so that light emitted from one fibre is collected by the second fibre. The v-groove ensures that the core regions of the two fibres are positioned in level with each other, thereby ensuring that substantially all the light is coupled into the second fibre. It is not vital that the holes of the holey fibres are positioned in level with each other, however, if they are not positioned in level, a small loss of light can occur.

Silicon is a suitable material for fabrication of the package, since standard silicon processing techniques, such as KOH etching or reactive ion etching, can be used. Additionally, this material provides simple means for integrating electronic or optical components in the substrate, such as control logic or other electronic components for controlling the electrical field across the recess 103 or controlling the ambient temperature, and photo detectors or lasers. However, since silicon has a finite resistivity and conducts electrical current, a thermal oxidation of the silicon is necessary before depositing the conductive layer. The thermal oxidation creates a thin layer of electrically non-conductive silica on top of the silicon. The substrate 101 thus usually comprises a main layer 108 of silicon and a top layer 109 of silica. The conductive layers or electrodes can be deposited using for instance vapour deposition, dip coating and/or spray coating.

For silicon substrates, the electrodes typically comprise a titanium layer for binding to the substrate and a gold layer on top of the titanium layer. However, any electrically conductive material can be used.

Preferably, also a conductive layer will be provided directly on the silicon substrate. The conductive layer can be used to ground the silicon substrate, thus forming a large equipotential plane. This has shown to provide enhanced performance for the package, when in use.

The package can also be formed by silica using standard silica processing techniques. Alternatively, the package can be fabricated in a polymer material, such as PMMA or polycarbonate. Thereby, the substrate can be fabricated using for instance injection moulding, hot embossing and/or micro machining. This material also makes it possible to imbed electrodes and electronic components in the polymer substrate.

The substrate 101 comprises a first mounting area 112 at the first end of the recess 103 and a second mounting area 113 at the second end of the recess 103. These two mounting areas 112, 113 are used for securing or fastening the optical fibre 1 or fibres to the substrate 101. A conventional fibre holder can be used, but it can also be sufficient to use an adhesive for securing the fibre to the surface. By fastening the fibre in the two mounting areas 112, 113, it is ensured that no stress fields occur in the fibre within the recess, which can have undesired effects in respect to tuning the transmission spectrum of the fibre.

The recess typically has a width and a depth of 10-200 µm, 15-100 µm, or 20-50 µm and the length of the recess is typically 0.5-10 cm, 1-5 cm or 1-3 cm. However, these sizes can be modified for instance to accommodate for the diameter of the specific fibre, which is to be positioned in the recess, and the length of the region of the fibre, which is filled with liquid crystal.

In a particular embodiment, the substrate 101 has a length of 30 mm, where both the length of the first 112 and the second mounting area 113 are 5 mm. The width of the substrate is 10 mm. The width of the recess 103 is 34 µm and the depth of the recess 103 is 21.5 µm. The top layer 109 of the substrate is 2 µm thick, and the coated layer of conductive material is 400 nm thick. The gap between the two lower parts of the electrodes 106, 107, cf. FIG. 3, is 10 µm wide. The area of the two electrodes, which are positioned on top of the first surface 102 of the substrate 101 is 50 µm wide. The two additional electrodes 110, 111 are 200 µm wide.

Figure 4:
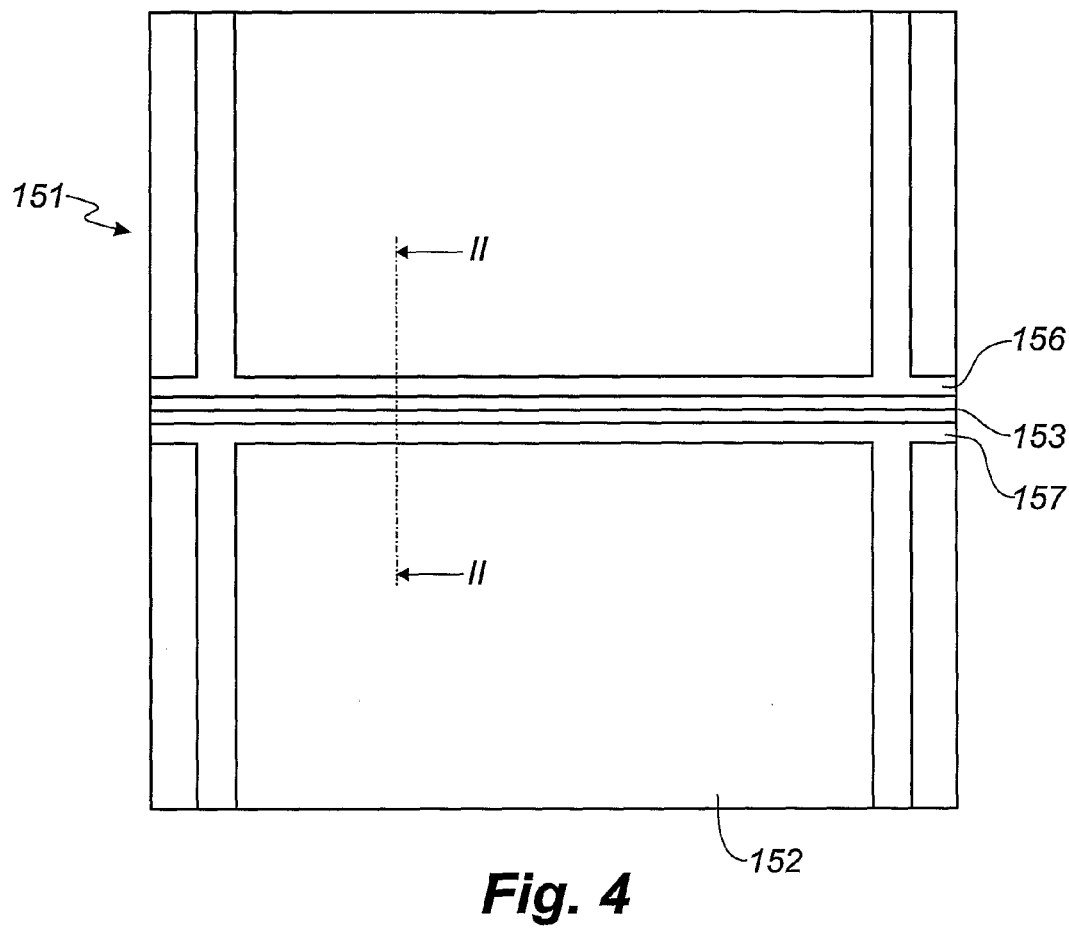
Figure 5:
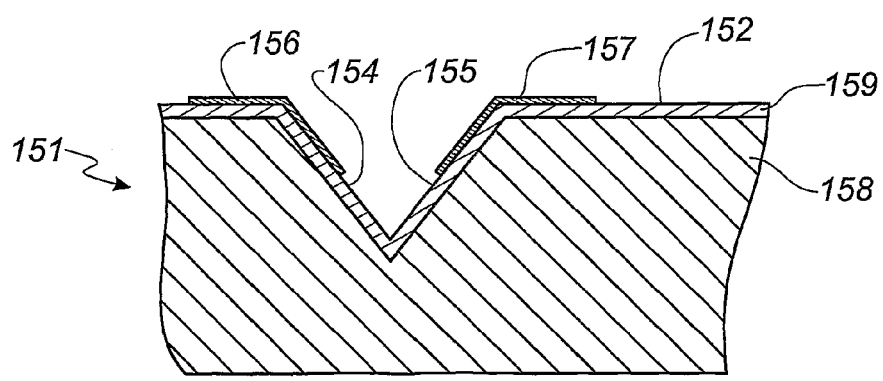

FIG. 4 shows a schematic view of a cap 151 according to the invention, and FIG. 5 the cross section of the cap 101 along the line II-II in FIG. 5. The cap 151 comprises a first surface 152, in which a recess 153 is formed, said recess 153 being positioned in the centre of the cap and extending in the entire longitudinal direction of the cap 151. The recess 151 is in this embodiment shaped as a v-groove with a first recess surface 154 and a second recess surface 155. The first recess surface 154 has a first area 156, which is provided with an electrically conductive layer, and the second recess surface 155 has a second area 157, which is provided with an electrically conductive layer. The two areas provided with a conductive layer in effect form a first electrode 156 and a second electrode 157, which can be applied to a voltage source, thereby creating a voltage potential between the two electrodes 156, 157 and in effect forming an electrical field between the two electrodes 156, 157. In the shown embodiment, the two electrodes 156, 157 extend substantially along the entire length of the recess 153 and consequently an electrical field, which is substantially constant in the entire length of the recess 153, is formed. The two electrodes 156, 157 can be formed, so that the entire electrodes are located inside the recess 153, but they can also be formed so that part of the electrodes are located on top of the first surface 152 of the recess 151 as shown in FIG. 4 and FIG. 5.

In a particular embodiment, the cap 151 has a length of 15 mm. The width of the substrate is 10 mm. The width of the recess 153 is 34 µm and the depth of the recess 153 21.5 µm. The top layer 159 of the substrate is 2 µm thick, and the coated layer of conductive material is 400 nm thick. The gap between the two lower parts of the electrodes 156, 157, cf. FIG. 5, is 10 µm wide. The area of the two electrodes, which are positioned on top of the first surface 152 of the substrate 151 is 50 µm wide.

Figure 6:
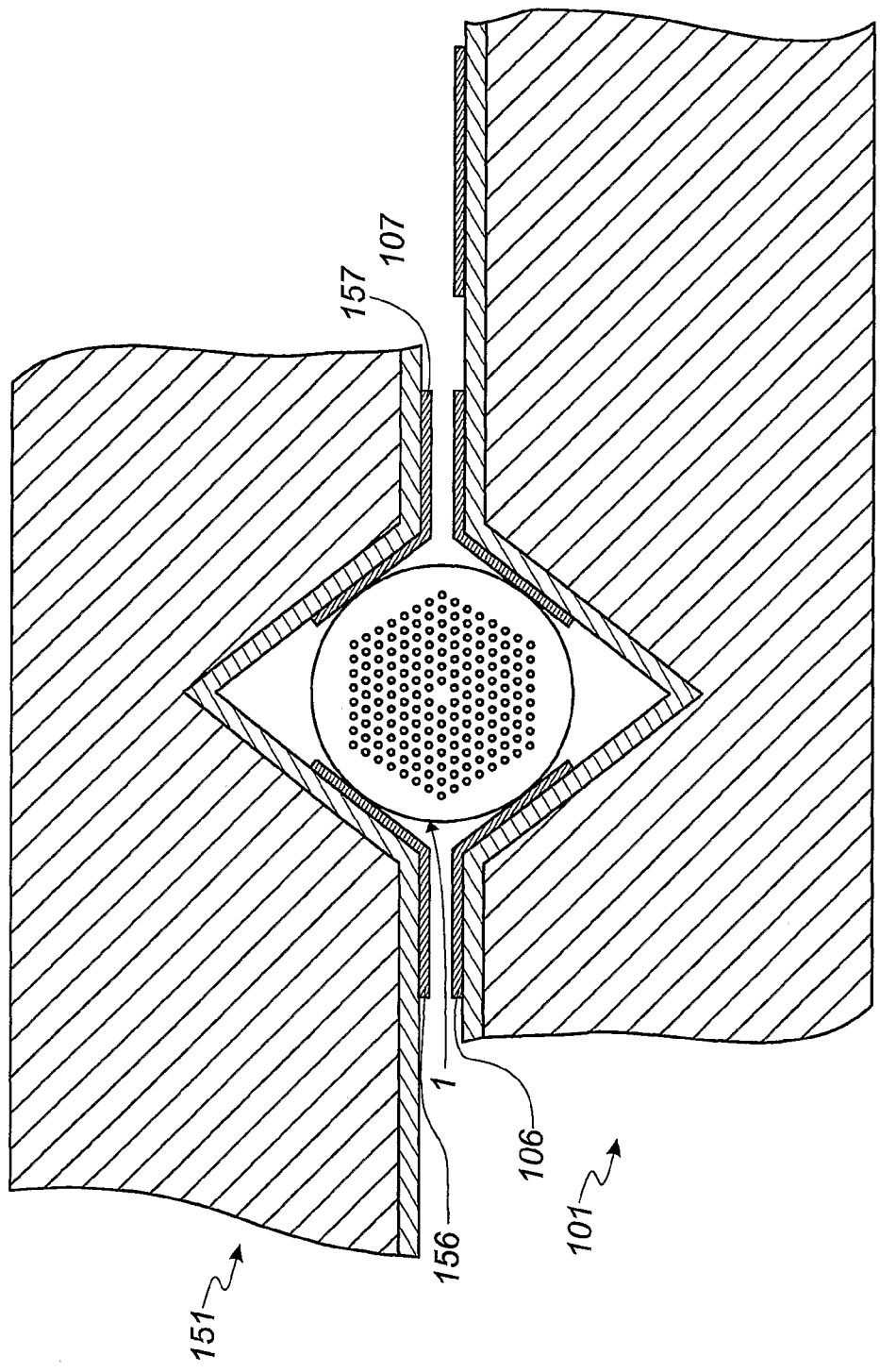

An assembly according to the invention is shown in FIG. 6. The assembly comprises a substrate 101 as shown in FIG. 2 and FIG. 3, a cap 151 as shown in FIG. 4 and FIG. 5, and a fibre 1 as shown in FIG. 1. The recess 103 of the substrate 101 and the recess 153 of the cap define a longitudinally extending channel, in which the fibre 1 is positioned. The fibre 1 is thus "sandwiched" between the substrate 101 and the cap 151. Preferably, the substrate 101 and the cap 151 are mutually spaced in order to ensure that the electrodes of the individual parts do not make contact.

The first electrode 106 and the second electrode 107 of the substrate 101, and the first electrode 156 and the second electrode 157 of the cap 151 are positioned across from each other, and the four electrodes make it possible to a high degree to form the electrical field across the channel. In the shown embodiment, the electrical field is spatially constant along substantially the entire channel of the assembly. This layout of the electrodes can for instance be used for modifying the polarisation state of the light propagating through the fibre, since the electrical field can be used to modify the orientation of the liquid crystals in the fibre 1. It is of course possible to vary the electrical field temporally.

The substrate 101 and the cap 151 can have mating parts, making an easy assembly of the two parts feasible. These mating parts can for instance be a tongue/groove connection. However, other types of alignment notches can also be used.

Figure 7:
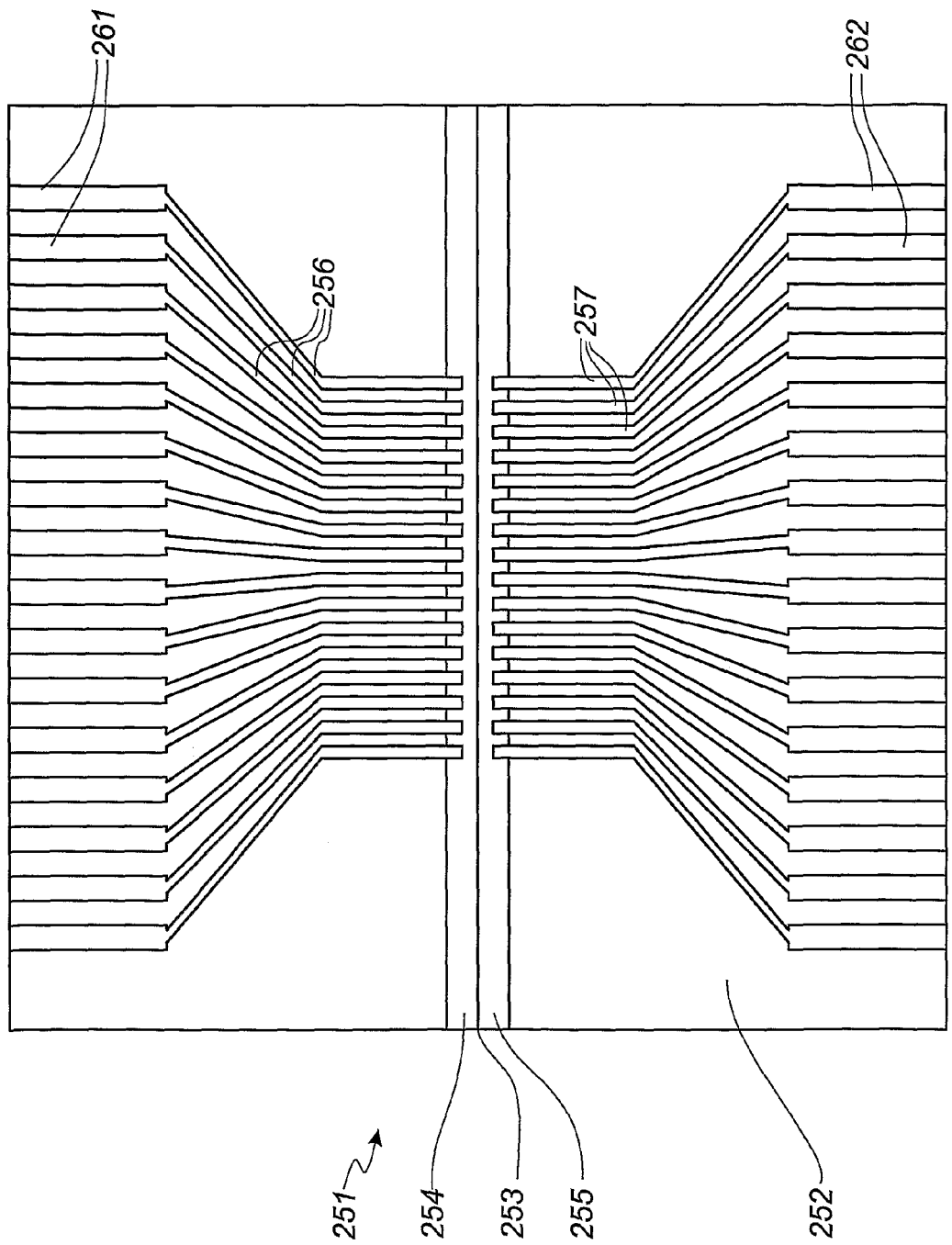

FIG. 7 shows a second embodiment of a cap 251 according to the invention. This cap 251 is used in an assembly in the same way as the cap 151 shown in FIG. 6. The cap 251 comprises a first surface 252, in which a recess 253 is formed, said recess 253 being positioned in the centre of the cap 251 and extending in the entire longitudinal direction of the cap 251. The recess 251 is in this embodiment shaped as a v-groove with a first recess surface 254 and a second recess surface 255. The first recess surface 154 has a number of first areas 156, which are provided with an electrically conductive layer, and the second recess surface 155 has a number of second areas 157, which are provided with an electrically conductive layer. The two areas provided with a conductive layer in effect form a number of first electrodes 156 and a number of second electrodes 157. The first electrodes 256 have a number of first contact pads 261 and the second electrodes 257 have a number of second contact pads 262. The contact pads 261, 262 can be applied to a voltage source, thereby creating a voltage potential between the electrodes and in effect forming an electrical field between the electrodes.

The cap 251 can similar to the embodiment shown in FIG. 6 be used in an assembly together with the substrate 101, the recess 253 of the cap 251 together with the recess 103 of the substrate defining an longitudinally extending channel, in which an optical fibre 1 is located. Thereby, it is possible to form an electrical field across the channel using the electrodes 106, 107 of the substrate 101 and the electrodes 256, 257 of the cap 251. The distribution of the first electrodes 261 and the second electrodes 262 of the cap 251 makes it possible to vary the voltage and thereby also the electrical field in the longitudinal direction of the channel. This introduces new possibilities with regards to tuning the transmission properties of the fibre 1 positioned in the channel.

The first electrodes 261 and the second electrodes 262 of the cap 251 can for instance be periodically spaced, which makes it possible to vary the electrical field periodically along the length of the channel. This can be used to induce a grating structure in the fibre 1 through for example periodic reorientation of the liquid crystals placed in the hole or holes of the fibre 1. This corresponds to a grating structure and can thus be used as a notch filter for removing specific wavelengths of the transmitted optical signal from the fibre 1. The electrodes 261, 262 can for instance be spaced with a period of 400 μm and where the width of the individual electrodes is 200 μm, i.e. half the period. The electrode layout can of course also be used for a substrate of an assembly.

Figure 8:
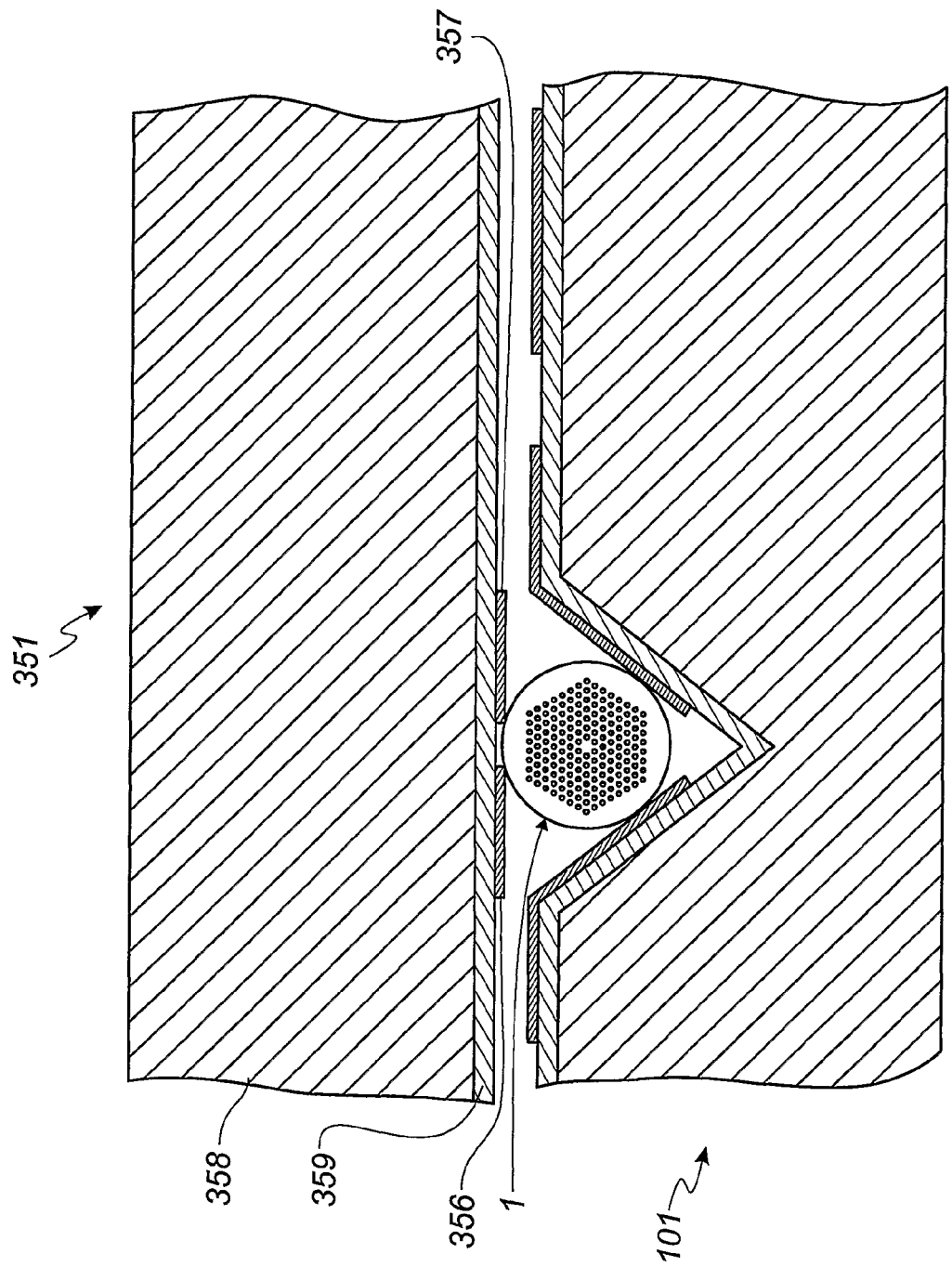

It should be noted, that the cap of the assembly does not necessarily have to comprise a recess. For instance, the assembly can comprise a substrate 101 as shown in FIG. 2 and FIG. 3 and a cap 351 as shown in FIG. 8. A fibre 1 is positioned in the recess 103 of the substrate and is sandwiched between the substrate 101 and the cap 351. The cap 351 comprises a first area 156, which is provided with an electrically conductive layer, and a second area 157, which are provided with an electrically conductive layer. The two areas provided with a conductive layer in effect form a single or a number of first electrodes 156 and a single or a number of second electrodes 157. The electrodes are provided on a substantially planar surface of the substrate, which comprises a main layer 358 and a top layer 359, for instance made of silicon and silica, respectively. An electrical field can thus be created across the channel by use of the electrodes 106, 107 of the substrate 101 and the electrodes 356, 357 of the cap 351.

Figure 9:
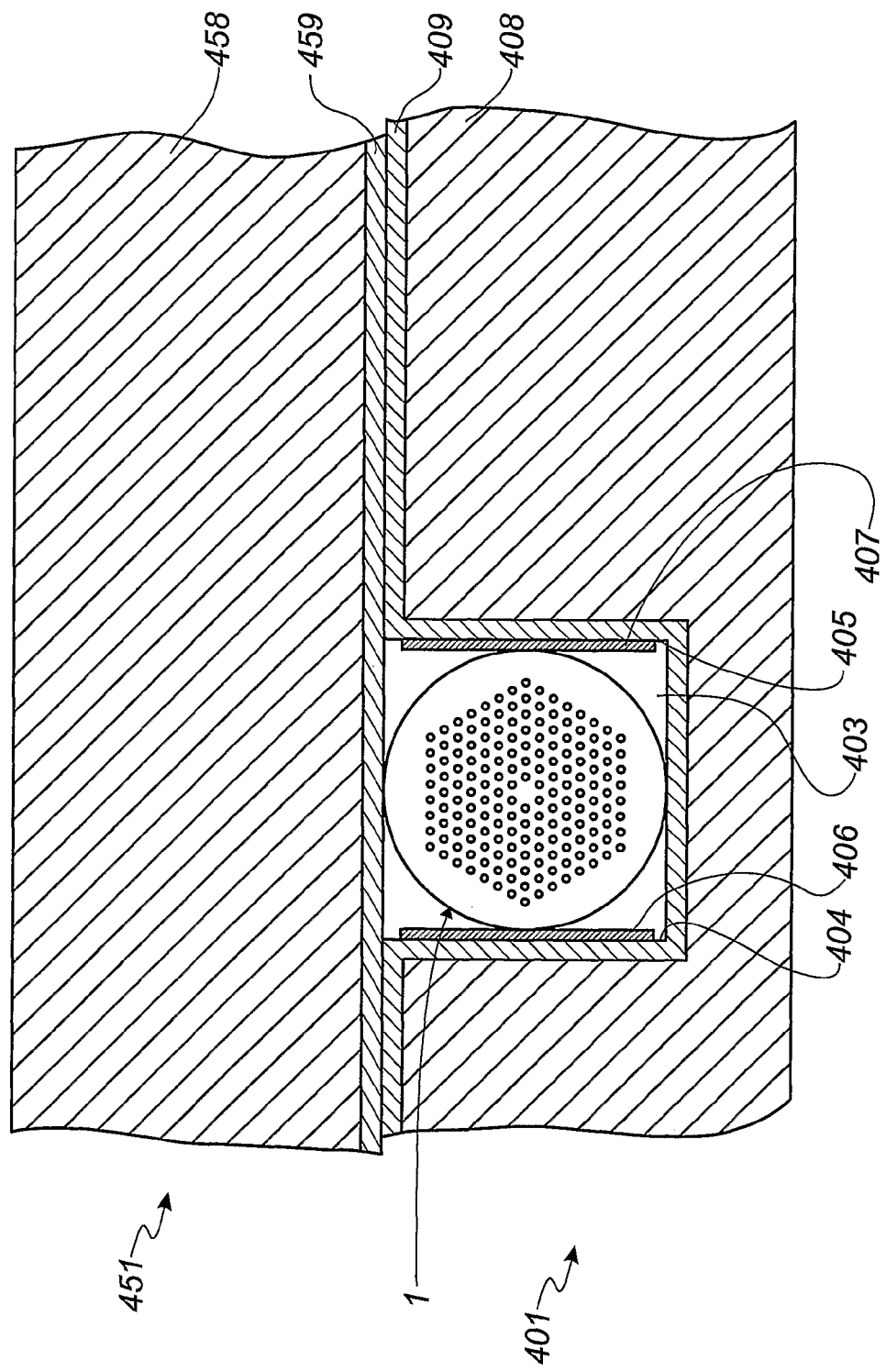

FIG. 9 depicts a third embodiment of an assembly, which comprises a substantially planar cap 451, a substrate 401, and a fibre 1. The substrate 401 comprises a first surface, in which a recess 403 is formed, said recess 403 extending in the centre of and in the longitudinal direction of the substrate 401. The recess 403 is in this embodiment shaped as a square groove with a first recess surface 404 or first side wall and a second recess surface 405 or second side wall. The first recess surface 404 has a first area 406, which is provided with an electrically conductive layer, and the second recess surface 405 has a second area 407, which is provided with an electrically conductive layer. The two areas provided with a conductive layer in effect form a first electrode 406 and a second electrode 407, which can be applied to a voltage source, thereby creating a voltage potential between the two electrodes 406, 407 and in effect forming an electrical field between the two electrodes 406, 407. The substrate comprises a main layer 408 of for instance silicon and a non-conductive top layer 409 of for instance silica.

A fibre 1 is positioned in the recess 403 and the cap 451 is positioned on top of the substrate 401. The cap 451 comprises a main layer 458 of for instance silicon and a non-conductive top layer 459 of for instance silica. Thereby, it is ensured that no electrical contact between the substrate 401 and the cap 451 exist. The shown embodiment makes it possible to form a uniform electrical field across the recess 453, in which the fibre 1 is located. The electrodes 406, 407 can extend substantially along the entire length of the recess 403 or can be periodically or otherwise distributed in the longitudinal direction of the recess 403.

The invention has been described with reference to a preferred embodiment. However, the scope of the invention is not limited to the illustrated embodiment, and alterations and modifications can be carried out without deviating from said scope of the invention. The electrodes of the substrate for instance do not have to extend along the entire length of the recess but can be periodically or otherwise distributed along the longitudinal direction of the recess. In general, the distribution of the electrodes in the longitudinal direction can have any layout, which is suited for the desired tunability of the transmission spectrum of the fibre.

LIST OF REFERENCE NUMERALS

1 Optical fibre
2 Core region
3 Background cladding material
4 Cladding elements
5 Over-cladding region
101, 401 Substrate
102 First surface of the substrate
103, 403 Recess of the substrate
104, 404 First recess surface
105, 405 Second recess surface
106, 406 First area provided with conductive layer/first electrode
107, 407 Second area provided with conductive layer/second electrode
108, 408 Main layer of substrate
109, 409 Top layer of substrate
110 First additional area provided with conductive layer/first electrode
111 Second additional area provided with conductive layer/second electrode
112 First mounting area of substrate 113 Second mounting area of substrate
151, 251, 351, 451 Cap
152, 252 First surface of the cap
153, 253 Recess of the cap
154, 254 First recess surface
155, 455 Second recess surface
156, 256, 356 First area provided with conductive layer
157, 257, 357 Second area provided with conductive layer
158, 258, 358, 458 Main layer of substrate
159, 259, 359, 459 Top layer of substrate
261 First contact pads
262 Second contact pads

The invention claimed is:

1. A package comprising:
a substrate (101, 401) with a longitudinal direction and a lateral direction perpendicular thereto, said substrate (101, 401) having a recess (103, 403) formed in a first surface (102, 402) and extending in the longitudinal direction of the substrate (101, 401) said recess (103, 403) having an inner surface, said inner surface of said recess (103, 403) comprising at least a first set of conductive areas, said first set comprising at least a first area (106, 406) and a second area (107, 407) being provided with a conductive layer, said first area (106, 406) and said second area (107, 407) being mutually spaced in the lateral direction, and
a cap (151, 251, 351, 451) with a first surface (152, 252, 352, 452) for mounting on top of said first surface (102, 402) of said substrate (101, 401), the cap (151, 251, 351, 451) and the recess (103, 403) of the substrate (101, 401) defining an elongated channel in the longitudinal direction, characterised in that
said cap (151, 251, 351) comprises at least a first set of conductive areas, said first set comprising at least a first area (156, 256, 356) and a second area (157, 257, 357) provided with a conductive layer, said first area (156, 256, 356) and said second area (157, 257, 357) being mutually spaced in the lateral direction.

2. A package according to claim 1, characterised in that said cap (151, 251, 351) comprises a recess (153, 253, 353) with an inner surface, said first area (156, 256, 356) and said second area (157, 257, 357) of said cap (151, 251, 351) being located on said inner surface.

3. A package according to claim 1, characterised in that the recess (103, 403) of the substrate (101, 401) and/or the recess (153, 253, 353) of the cap (151, 251, 351) is shaped as a v-groove or a flattened v-groove.

4. A package according to claim 1, characterised in that the recess (103, 403; 153, 253, 353) extends in the entire longitudinal length of the substrate (101, 401) and the first set of conductive layers extends substantially along the entire length of said recess (103, 403; 153, 253, 353).

5. A package according to claim 1, characterised in that the substrate (101, 401) and/or the cap (151, 251, 351, 451) in the longitudinal direction has a number of sets of conductive layers.

6. A package according to claim 1, characterised in that the substrate (101, 401) and/or the cap is fabricated in silicon (151, 251, 351, 451).

7. A package according to claim 1, characterised in that the substrate (101, 401) and/or the cap (151, 251, 351, 451) comprises at least one additional area (110, 111) provided with a conductive layer, said additional area (110, 111) providing sensing means or actuating means.

8. A package according to claim 1, characterised in that the substrate (101, 401) and/or the cap (151, 251, 351, 451) additionally comprises one or more electrical or optical components.

9. A package according to claim 1, characterised in that the substrate and/or the cap comprise one or more additional areas provided with a conductive layer directly on the surface of the substrate and/or the cap.

10. An assembly comprising a package according to claim 1 and further comprising at least one optical fibre (1) positioned in said recess (103, 403) of the substrate (101, 401).

11. An assembly comprising a package according to claim 10, characterised in that the fibre (1) comprises at least one longitudinally extending hole being filled with a material having optical properties, such as refractive index, which are dependent on temperature and/or electrical fields.

12. An assembly according to claim 9, characterised in that said package comprises fastening means for fastening the optical fibre (1), said fastening means preferably being located outside the recess (103, 403) of the substrate (103, 403).

13. An assembly according to claim 9, characterised in that the substrate (101, 401) and cap (151, 251, 351, 451) are sealed with an adhesive.

14. An assembly according to claim 13, characterised in that the adhesive is a thermally conductive material, such as thermally conducting epoxy.

* * * * *